Aug. 28, 1956 P. ORZEL 2,760,764

COOLING TOWERS

Filed May 27, 1953 4 Sheets-Sheet 1

Aug. 28, 1956 P. ORZEL 2,760,764

COOLING TOWERS

Filed May 27, 1953 4 Sheets-Sheet 3

United States Patent Office 2,760,764

Patented Aug. 28, 1956

2,760,764

COOLING TOWERS

Paul Orzel, deceased, late of Bogota, N. J., by Elly Orzel, administratrix, Bogota, N. J., assignor to said Elly Orzel, personally, Joseph Lichtenstein, Bayside, N. Y., and William J. Rooney, White Plains, N. Y.

Application May 27, 1953, Serial No. 357,838

7 Claims. (Cl. 261—30)

This invention relates to heat exchangers and to means and methods for changing the temperature of liquids by contact with moving gas or air, and more particularly to apparatus and cooling towers for cooling water by contact with air, though it is noted that in some of the claims the invention is not limited to cooling water or even to cooling.

Objects of the invention are to provide an improved tower or apparatus of this kind of flexible design which does not waste water or power for operation, is free of clogging, and is free from wind interference when used exteriorly, and to provide film-contact cooling without the disadvantages heretofore experienced.

Other objects of the invention are to provide an improved apparatus of this kind which is noiseless, free of spray and suitable for installation inside of buildings.

Additional objects of the invention are to effect simplicity and efficiency in such methods and apparatus and to provide an extremely simple apparatus of this kind which is economical, durable, and reliable in operation, convenient to assemble and disassemble, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with cooling towers each of which briefly stated, includes closed superposed main upper and lower troughs surrounding an air space open below and above for the upward flow of cooling air, in which space are disposed upper and lower channel header sheets respectively carrying laterally closely spaced upwardly open upper distributing channels having overflow edges all in the same plane, and lower collecting channels, respectively having their ends communicating with the upper and lower intermediate troughs respectively.

Film plates are carried by the lower header sheets and are supported under the upper channels and have lower edges disposed in the collecting channels.

Means are provided for conducting water or other liquid to be cooled to the upper main trough to flow through the upper trough into the distributing channels and over the overflow edges and down the wide faces of the film plates, in contact with the cooling air, and into the collecting channels.

Suitable means are provided for conducting water from the lower main trough.

Each pair of header plates and the parts carried thereby may be as units separately assembled or disassembled from association with the troughs.

Cooling towers effect the removal of heat from circulating water into the atmosphere, thus enabling the reuse of the water in a closed cycle for industrial purposes.

The cooling is effected by dividing or directing the water to be cooled to provide a large water surface or many surfaces and bringing the surfaces into intimate contact with cooling air.

A large variety of methods of providing the large cooling surface are used and may be divided into two classes, namely the spray surface method and the film surface method.

In the spray method, spray nozzles or nozzles and splash plates divide the water into a large number of small drops together forming a large cooling area. Air passes upward in contact with the drops and is cooled. A complicated system is required to feed the nozzles.

The pure spray tower provides insufficient contact surface. To cause the drops to stay within the tower for long contact, decks are provided which interrupt the drops in their fall, thus increasing the time contact.

The decks add surfaces on which the water flows and then falls to the next deck thereby forming new drops. The air is forced upward through the drops in countercurrent. After the air has passed the water it is forced to traverse a tortuous system of baffles or eliminators to clean it of water drops the air carries with it. The pressure-drop of the air passing through the heavy rain of drops is large, and the pressure drop through the eliminators does not contribute to performance. To force air through such a system, high stacks or fans driven by electric motors of large power requirements are used.

Modern air conditioning requires large amounts of cooling water, usually taken from city water systems. Cities and States are beginning to prohibit the once-through use of cooling water and demand the use of cooling towers. The very small towers required for the use of 5-ton refrigeration plants offer a problem. Towers designed as described above in small scale require installation usually on the roof of the building. The need for a tower that can be installed inside the building is great; but these roof towers are not suitable for inside installation, because of the noise, and the sprayed water.

Film surface contact eliminates the disadvantages of the drop or spray surface contact for cooling the water, but so far there has not appeared on the market a satisfactory method of spreading a large amount of water on plates for contact with the cooling air or gas. The disadvantages of film towers have long been recognized, but the problem of water distribution over the film surfaces has heretofore not been solved satisfactorily.

The distribution of water over the film surfaces is sometimes accomplished by spray nozzles, but a sufficient distribution by this means is not accomplished. Also spray eliminators are required and water noises are not eliminated. Where the water is subdivided into progressively smaller streams by means of branching pipes, a very cumbersome and complicated piping system is required, and the water is distributed over the plates from small holes from the smallest pipes, but the fine openings become quickly clogged and good distribution is not achieved.

Objects of the present invention are to provide an efficient film-contact system and to eliminate the defects of the previous film-contact cooling apparatus and towers, and it provides an ideal cooling tower design providing a closed cooling space having within it a large number of closely spaced film plates which may be small in height. The water is distributed evenly over the whole length of every plate and runs down over each plate in the form of a very thin film. The space between the plates is free of any downpour of water drops or other obstruction and through this space air flows in intimate contact with the water for the exchange of heat and water vapor.

The advantages as compared to the conventional cooling tower are as follows:

1. Since the cooling surface is not dependent upon cascading of water over decks and from great heights, the pumping head and the power required for pumping is very greatly reduced.

2. Since the flow of air through the channels formed by the film plate is absolutely unobstructed, the pressure drop is substantially negligible, as compared to the pressure drop required for overcoming the resistance of the heavy rain of drops, the decks and the spray eliminators of the conventional tower. The power requirements are so small that fans can be eliminated and replaced by stacks of comparatively low height.

3. Since no spray exists no spray eliminators are required.

The features incorporated in this invention are novel, quite different from those found in practice and offer many advantages.

An important feature of this invention is the method employed in distributing water over the film surfaces.

The troughs are so designed that a flow of water of the amount required results in very low water velocities, and when a pump discharges this quantity of water into the upper trough, the result is a rise in the water level and an overflowing from each channel.

Each channel receives an equal quantity of water per unit of its length and the water film thus created covers each film plate. Every square foot of film surface has its proportionate share of water film in contact with the cooling air. No cumbersome piping system is required. There is no passage through very small openings to be clogged. The method of distribution is simple, effective and trouble free.

In the accompanying drawing showing, by way of example, two of many possible embodiments of the invention, Fig. 1 is a fragmental end elevation showing one form of the cooling tower;

Figure 1:
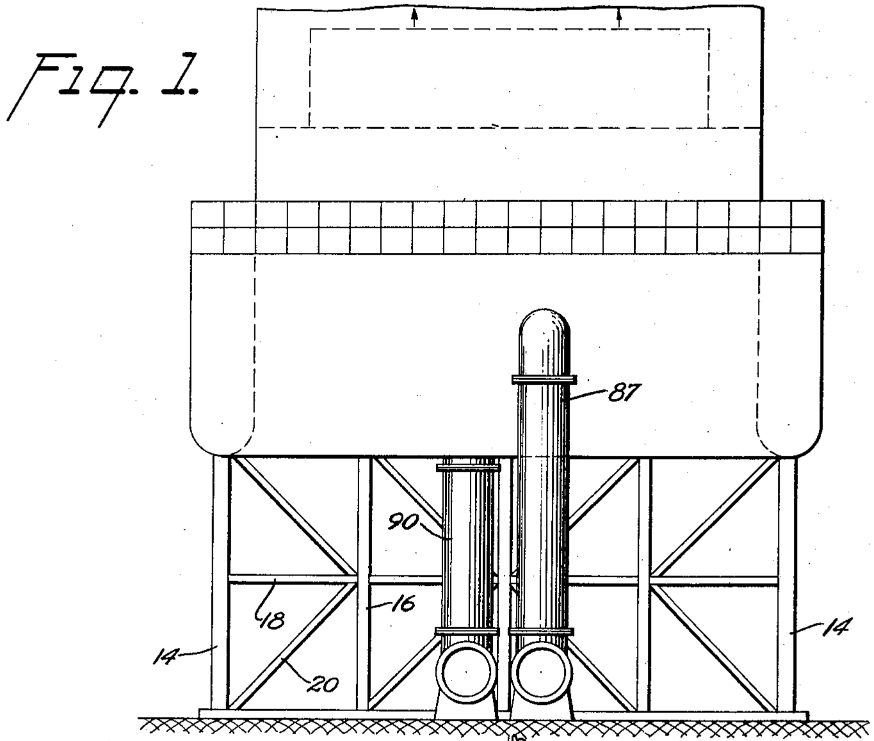
Figure 2:
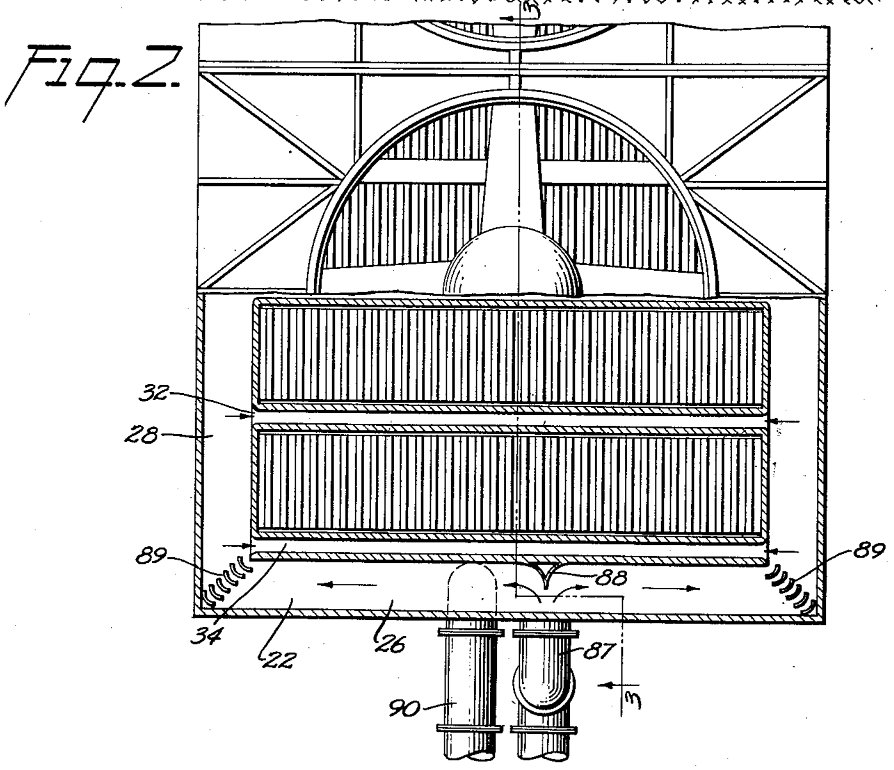
Fig. 2 is a fragmental plan partly in horizontal section on the line 2—2 of Fig. 3.
Figure 3:
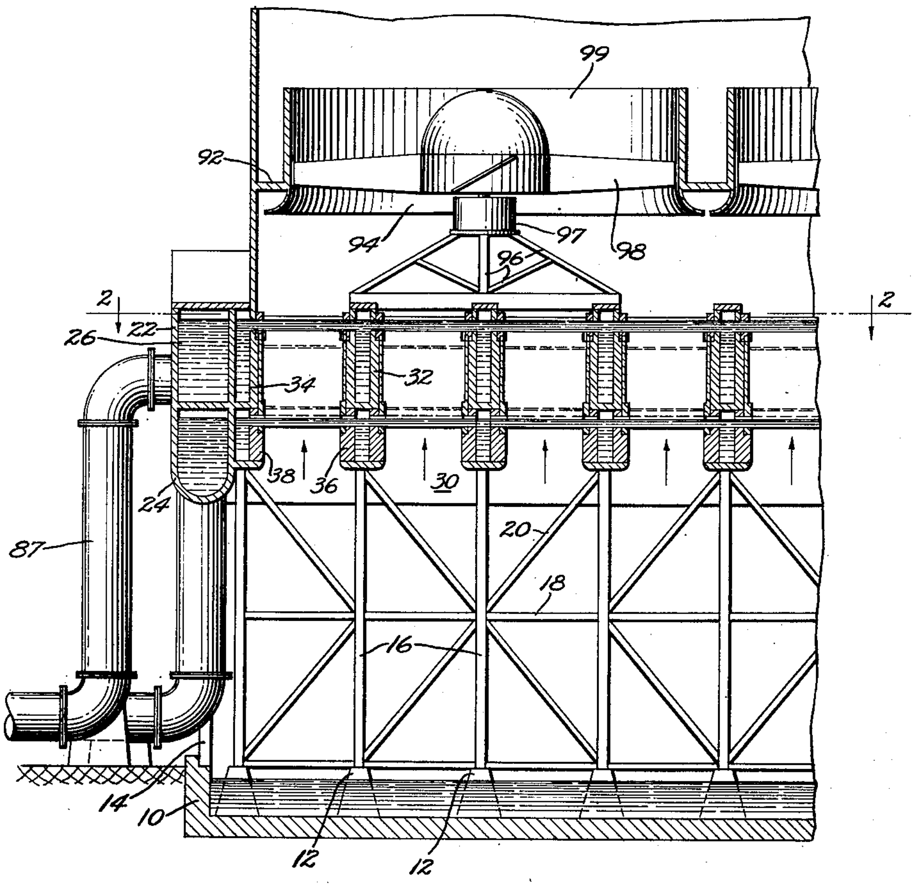
Fig. 3 is a fragmental vertical sectional view, partly in elevation, showing the cooling tower, the section being taken substantially on the line 3—3 of Fig. 2, looking in the direction of the arrows of said line.
Figures 4, 5:
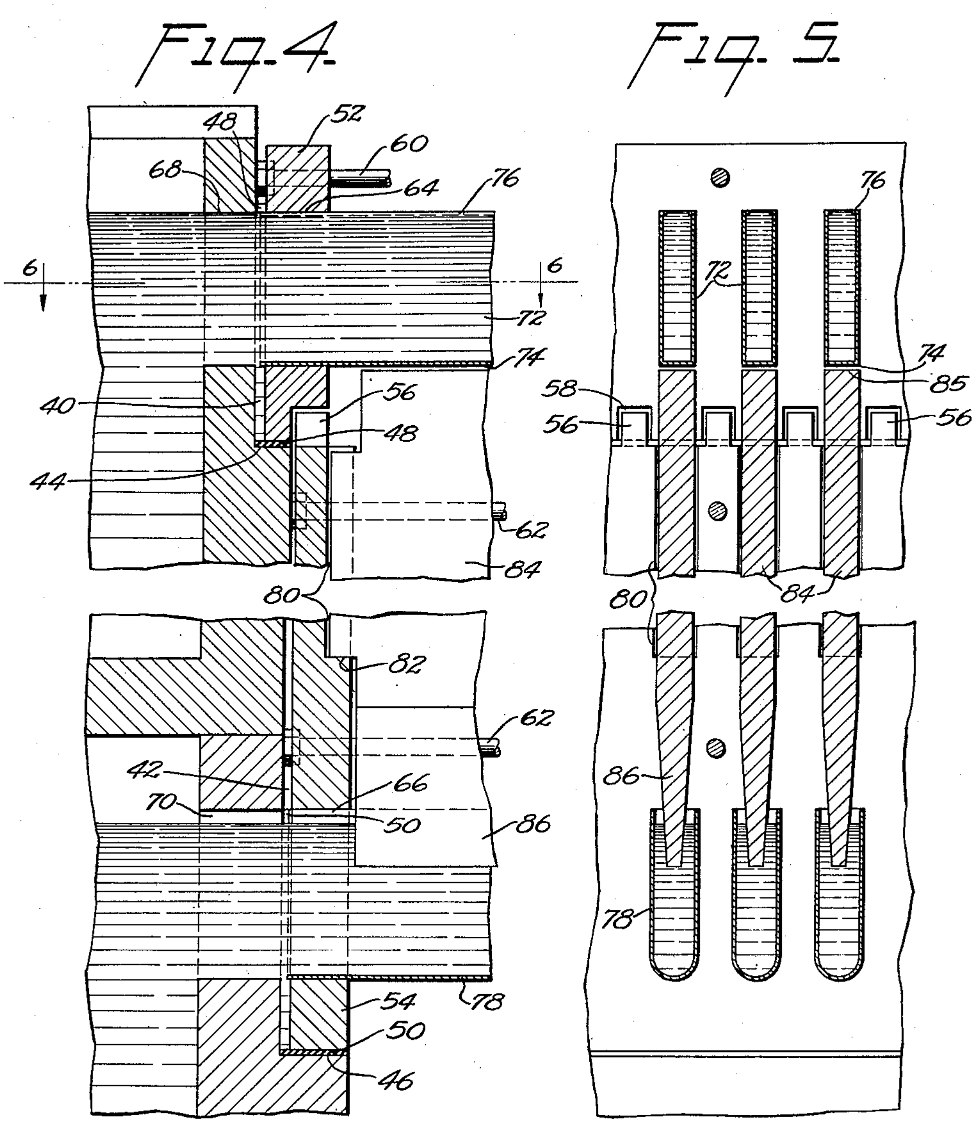
Fig. 4 is a fragmental vertical sectional view partly in elevation taken longitudinally through the channels and transversely of intermediate trough and drawn on a larger scale.
Fig. 5 is a fragmental vertical sectional view, partly in elevation, taken transversely through the channels and film plates, the section being drawn on said larger scale.
Figure 6:
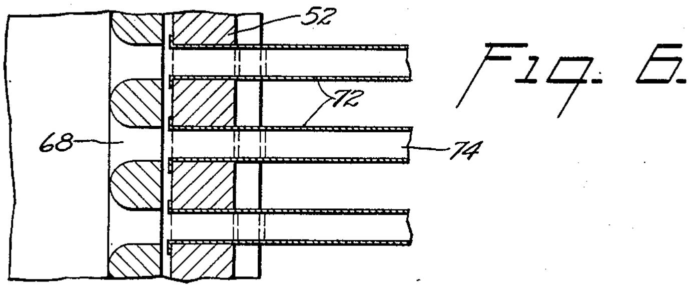
Fig. 6 is a fragmental horizontal sectional view, partly in plan, the section being taken substantially on the line 6—6 of Fig. 4, looking in the direction of the arrows of said line.

The cooling tower of Figs. 1 to 6 particularly suitable for large installations may be erected at any suitable location, but is here shown disposed over a wide shallow water storage basin 10 (Fig. 3) supported in the ground or other support and in which are disposed masonry pillars 12 projecting above the water level and carrying a supporting frame work structure comprising outer and inner posts 14, 16 resting on the pillars 12 and horizontal and diagonal braces 18, 20 connecting the posts.

Superposed endless closed upper warm water and lower cold water storage main troughs 22, 24 mounted on the outer posts comprise sections 26, 28 (Fig. 2) joining at right angles and surrounding an air space 30 (Fig. 3) open below and above for the upward flow of cooling air entering beneath the lower trough 24. Superposed upper and lower widely spaced intermediate troughs 32, 34, 36, 38 disposed parallelly across said space and connected to, and communicating with, one pair of opposite sections 28 of the main troughs are supported by the inner posts 16 and the inner walls of said main trough sections 28, two of the intermediate troughs 34, 38 being adjacent to the other two main trough sections 26, respectively.

The upper parts of the walls of the intermediate sections facing other intermediate section walls are provided with upper and lower longitudinal recesses 40, 42 (Fig. 4) forming upper and lower ledges 44, 46 on which rest upper and lower gaskets 48, 50, the gaskets extending up the sides of the recesses.

Upper distributing channel header sheets 52 and lower collecting channel header sheets 54 rest on said gaskets respectively, the lower header sheets 54 extending up to the upper header sheets and having spaced teeth 56 (Figs. 4 and 5) on its upper edge received in recesses 58 in the outer margin of the bottom face of the upper sheets 52. Horizontal bolts 60, 62 connect opposite header sheets.

Said header sheets 52, 54 have vertically elongated spaced openings 64, 66 staggered with said teeth 56, the adjacent intermediate trough walls having openings 68, 70 registering with and communicating with the openings 64, 66 of the header sheets. Upwardly open upper distributing channels 72 having lower flat faces 74 and upper overflow edges 76, all in the same plane, and slightly wider lower collecting channels 78 respectively have their opposite ends fitted in said openings 64, 66 of the upper and lower header sheets.

Each lower header sheet has in its outer face upwardly and outwardly open vertical recesses 80 staggered with said openings 64, 66 and about as wide as the upper channels and having lower end seats 82 above the level of the lower troughs; and redwood film plates 84 as thick as the upper channels are wide supported in said vertical recesses have flat upper faces 85 disposed from end to end under and substantially or nearly in contact with the lower flat faces 74 of the upper channels, said plates having lower extensions 86 below said seats having tapering lower edge parts disposed in the collecting channels 78.

The recesses 58 and teeth 56 cooperate to hold the adjacent edges of the sheets 52, 54 against relative longitudinal movement, and thus hold the film plates 84 in registration with the upper channels 72.

A warm water pipe 87 (Figs. 1 to 3) connected to the upper main trough 22 conducts the water to be cooled to the upper main trough at a rate to cause the cooling water to flow from the main trough through the intermediate troughs into the distributing channels 72 and over the overflow edges 76 and down the outer sides of the channel and the wide faces of the film plates 84 in a thin film in contact with cooling air and into the collecting channels 78. Flow guides 88, 89 (Fig. 2) prevent whirls in the upper main trough 22 at the discharge end of the pipe 87 and the adjacent corners of the trough. A suction line 90 is connected to the lower main trough 24, through which the cooled water leaves the cooling system.

A roof 92 over said air space 30 is mounted on the upper main trough 22 and has one or more large circular openings 94 over said space. Coaxially under each opening is shown a supporting structure 96 on intermediate channels 82 and supporting an axially vertical motor 97 coaxial with and below the opening and carrying a fan 98 on the shaft of the motor in the opening for drawing cooling air in at the bottom of said space 30 and upwardly between the film plates. Instead of or in addition to the fan 98, a stack 99 may surround the opening 94, which need not be tall as the resistance of the film plates 84 is small.

The opposite upper and lower header sheets and the parts carried thereby constitute separate units adapted to be separately assembled and disassembled with respect to the troughs, to facilitate erection, replacement or repair.

Figures 7, 8, 9, 10:
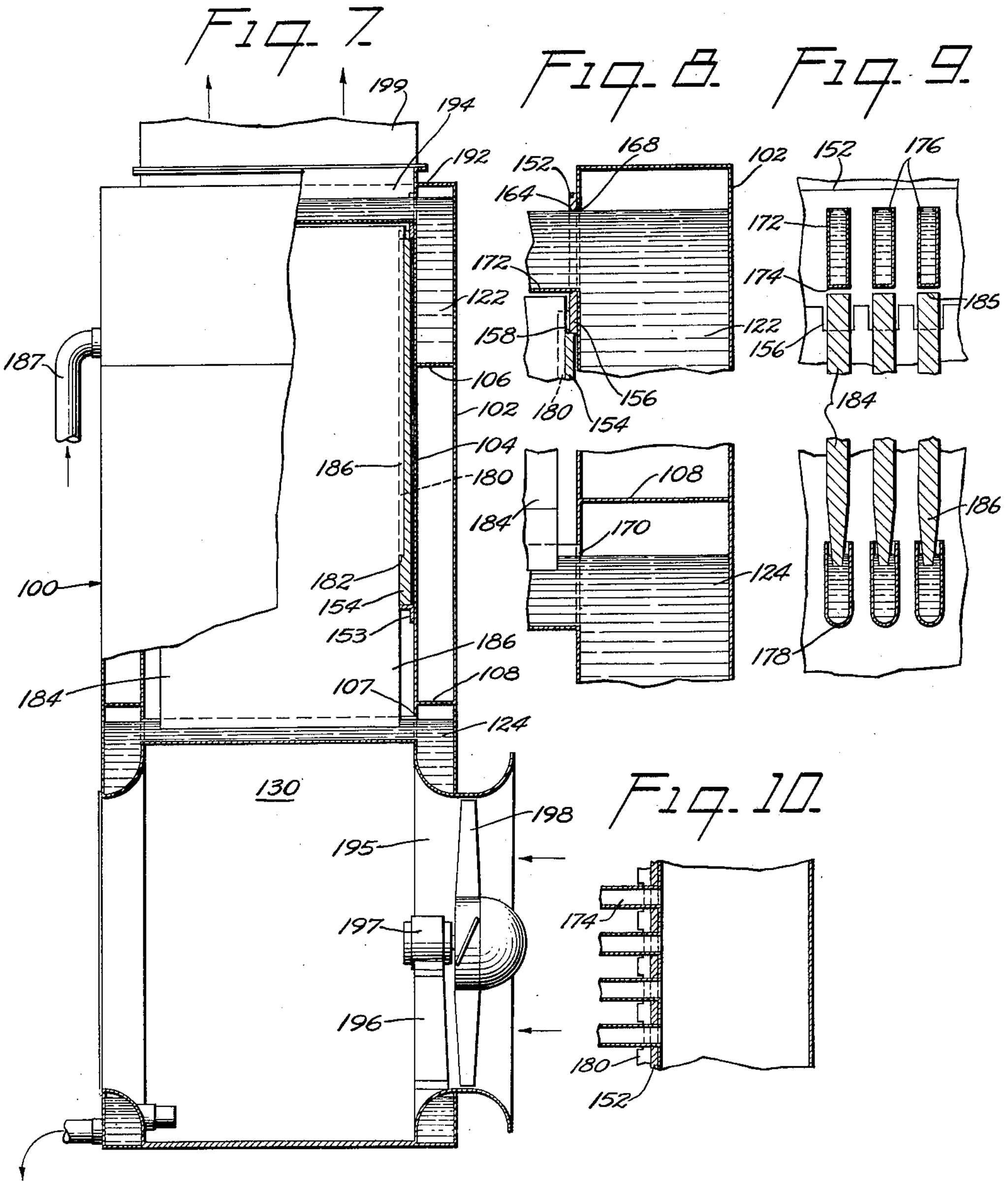
Fig. 7 is a fragmental vertical sectional view, partly in elevation, showing another form of cooling tower, the section being taken substantially along axes of the channels.
Fig. 8 is an enlarged fragmental vertical sectional view, partly in elevation, showing the section transversely through the trough and longitudinally of the channels of Fig. 7.
Fig. 9 is a fragmental vertical sectional view, partly in elevation, taken transversely of the channels and film plates of Fig. 8.
Fig. 10 is a fragmental horizontal sectional view, partly in plan, the section being taken through the distributing channels and upper trough of Fig. 8.

The cooling apparatus of Figs. 7 to 10 suitable for small or indoor installations comprises an upright casing 100 having outer and inner spaced walls 102, 104 and horizontal partitions 106, 108 connecting the walls and forming endless closed upper warm water and lower cold water storage troughs 122, 124 comprising sections joining at right angles and surrounding an air space 130 open below and above for the upward flow of cooling air entering at the lower part of the space. Opposite sections of the upper part of the inner walls of the upper and lower troughs are provided with upper and lower vertically elongated spaced openings 168, 170 communicating with the troughs.

Removable and replaceable channel header sheets 152 adjacent to said opposite sections of the upper trough have lower spaced teeth 156 and upper openings registering with the upper openings 168 of the upper trough and receiving the ends of upwardly open upper distributing channels 172 having lower flat faces 174 and upper overflow edges 176 all in the same plane. Slightly wider lower collecting channels 178 have their opposite ends fitting in said openings 170 of the lower trough.

Horizontal angle irons 153 secured on the inner wall 104 of the casing above the lower openings 170 support removable and replaceable film-plate supporting sheets 154 resting on said angle irons and extending up to the header sheets 152 and having in the inner upper margin spaced recesses 158 receiving said teeth 156. The supporting sheets 154 have in their outer face upwardly and outwardly open vertical recesses 180 under and about as wide as the upper channels and having lower end seats 182 above the level of the lower trough.

The ends of the upper channels 172 are sealed in the openings of the header sheets 152, thus holding the header sheets in place. The channels and header plates may be removed and replaced as a unit to facilitate these operations.

Said latter recesses 180 receive upright redwood film plates 184 as wide as the upper channels supported in said vertical recesses 180 on said seats 182 and having flat upper faces 185 disposed under the flat faces 174 of the upper channels, said plates having lower extensions 186 below said seats having tapering lower edge portions disposed in the collecting channels. The supporting sheets 154 and the film plates 180 may also be removed and replaced as a unit.

The recesses 158 and teeth 156 cooperate to hold the adjacent edges of header sheets 152 and supporting sheets 154 against relative longitudinal movement, and thus hold the film plates 184 in registration with the upper channels 172.

A top wall 192 is disposed on the upper main trough leaving a large opening 194 over the air space 130 and communicating with a duct 199 surrounding the opening for conducting away the warmed air. One or more circular openings 195 in the lower part of the side of the casing receives a pedestal 196 in each opening carrying an axially horizontal motor 197 coaxial with the opening and carrying in the opening a fan 198 on the motor shaft for forcing air into the bottom of said space 130 and upwardly between the film plates, to be cooled and forced outwardly through said duct 199; whereby is cooled warm water brought in through the warm water pipe 187 (Fig. 7) which will flow through the upper trough 122 into the upper channels 172 over the edges 176 down the wide faces of the film plates 184 into the lower channels 178, through the lower trough 124 and out at the outlet pipe 190.

The invention claimed is:

1. In combination, an upright casing having outer and inner spaced walls and horizontal partitions connecting the walls and forming superposed endless closed upper warm water and lower cold water storage troughs comprising sections joining at right angles and surrounding an air space open below and above for the upward flow of cooling air entering at the lower part of the space; opposite sections of the upper part of the inner walls being provided with upper and lower vertically elongated spaced openings communicating with the troughs; a channel header sheet adjacent to each of said opposite sections of the upper trough and having upper openings registering with the upper openings of the upper trough; upwardly open upper distributing channels having lower flat faces and upper overflow edges all in the same plane, and slightly wider lower collecting channels respectively having their opposite ends fitting in said openings of the lower trough; film plates extending and supported under the upper channels and having lower edges disposed in the collecting channels; means for conducting water to be cooled to the upper trough; and means for conducting water from the lower trough.

2. In combination, a casing having inner and outer walls and partitions forming superposed upper and lower troughs comprising opposite trough sections surrounding an air space open below and above for the upward flow of cooling air; separately removable and replaceable upper header sheets in said space adjacent to the upper troughs, the upper sheets having lower spaced teeth, upwardly open upper distributing channels having overflow edges all in the same plane, carried by said upper sheet and having their respective ends communicating with opposite upper trough sections; lower collecting channels, having their ends communicating with opposite sections of the lower trough; horizontal angle irons secured on the inner wall of the casing above the lower openings; said supporting sheets resting on said angle irons and extending up to the header sheet and having in the inner upper margin spaced recesses receiving said teeth, and in the outer face upwardly and outwardly open vertical recesses under and about as wide as the upper channels and having lower end seats above the level of the lower troughs; and redwood film plates as wide as the upper channels supported in said vertical recesses on said seats and having flat upper faces disposed under the upper channels, said plates having lower extensions below said seats having tapering lower edges disposed in the collecting channels.

3. In combination, troughs surrounding an air space open below and above; widely spaced channel header sheets supported between opposite sections of the upper trough and having vertically elongated spaced openings communicating with the upper trough; upwardly open upper distributing channels having lower flat faces and upright side walls having upper overflow edges all parts of which are unobstructed and in the same horizontal plane less elevated than the top of the trough and having their opposite ends fitting in said openings of the header sheet; said channels being free of structure adjacent to and between said edges; smooth film plates as wide as the upper channels supported beneath said channels, from end to end of said overflow edges and having flat upper faces disposed under the flat face of the upper channels, and wide side faces in the same plane with the outer faces of said side walls; spaced horizontal collecting channels receiving said lower edges and having their opposite ends communicating with said lower trough; and means for causing air to pass into the bottom of said space and upwardly between the film plates and out at the top of said space.

4. In combination, superposed endless closed upper warm water and lower cold water storage troughs surrounding an air space open below and above for the upward flow of cooling air entering at the lower part of the space; widely spaced channel header sheets supported between opposite sections of the upper trough and having lower spaced recesses, and vertically elongated spaced openings communicating with the upper trough; upwardly open upper distributing channels having lower flat faces and upright side walls having upper overflow edges all in the same horizontal plane less elevated than the top of the trough and having their opposite ends fitting in said openings of the header sheet; said channels being free of structure adjacent to and between said edges; lower ledges supported in said space near the inner wall of the lower trough; supporting sheets resting on said lower ledges and extending up to the header sheet and having in the inner upper margin spaced teeth received in said recesses; said sheet having in the outer face upwardly and outwardly open vertically elongated vertical recesses under and about as wide as the upper channels and having lower end seats above the level of the lower troughs; redwood film plates as wide as the upper channels supported in said vertical recesses on said seats and having flat upper faces disposed under the flat face of the upper channels, and wide side faces in the same plane with the outer faces of said upright side walls; said plates having lower extensions below said seats having tapering lower edges; spaced horizontal collecting channels receiving said lower edges and having their opposite ends communicating with said lower trough; a cover wall over said space on the upper main trough and a large opening over the space for exit of the warmed air; and means for causing air to pass into the bottom of said space and upwardly between the film plates and through said large opening.

5. In a cooling tower, in combination, endless closed upper warm water and lower cold water storage troughs; disposed one vertically above the other and surrounding an air space open below and above; means for supplying water to be cooled to the upper trough; widely spaced channel header sheets supported between opposite sections of the upper trough and having lower spaced recesses and vertically elongated spaced openings communicating with the upper trough; upwardly open upper distributing channels having lower flat faces and upright side walls having upper overflow edges all in the same horizontal plane, said troughs having their opposite ends fitting in said openings of the header sheet; said channels being free of structure adjacent to and between said edges; lower ledges supported in said air space near the inner wall of the lower trough substantially under said header sheets; supporting sheets resting on said lower ledges and extending up to the header sheet and having in the upper margin spaced teeth received in said lower recesses; said supporting sheets having in the outer face upwardly and outwardly open vertically elongated vertical recesses under and about as wide as the upper channels and having lower end seats above the level of the lower troughs; film plates as wide as the upper channels supported in said vertical recesses on said seats; said plates having flat upper faces disposed under the flat face of the upper channels, and wide side faces in the same plane with the outer faces of said upright side walls; said teeth, said lower recesses, said vertical recesses, and said sheets having the function of cooperating to hold adjacent sheets from relative longitudinal movement to hold the film plates under the upper channels and spaced horizontal collecting channels receiving said lower extensions and having their opposite ends communicating with said lower trough.

6. In a cooling tower, in combination, closed upper warm water and lower cold water storage troughs disposed one vertically above the other and surrounding an air space open above and below; removable and replaceable widely spaced channel header sheets supported between said opposite sections of the upper trough and having lower spaced recesses and vertically elongated spaced openings communicating with the upper trough; upwardly open upper distributing channels having upper overflow edges all in the same horizontal plane, said channels having their opposite ends fitting in said openings of the header sheet; whereby the header sheets and upper channels may be removed or replaced assembled with each other when removing or replacing the header sheets, said channels being free of structure adjacent to and between said edges; lower ledges supported in said air space near the inner wall of the lower trough; removable and replaceable supporting sheets resting on said lower ledges and extending up to the header sheet and having in the upper margin spaced teeth received in said lower recesses to hold the supporting sheets from movement longitudinal to the header sheets; said supporting sheets having in the outer face upwardly and outwardly open vertically elongated vertical recesses under and about as wide as the upper channels and having lower end seats above the level of the lower troughs; film plates as wide as the upper channels supported in said vertical recesses on said seats and adapted to be carried assembled with the supporting sheets when the supporting plates are removed or replaced; said plates being disposed under the upper channels, and wide side faces in the same plane with the outer faces of said upright side walls to receive warm water overflowing from said overflow edges, and spaced horizontal collecting channels receiving said lower extensions and having their opposite ends communicating with said lower trough.

7. In a cooling tower, in combination, endless closed upper warm water and lower cold water storage troughs disposed one vertically above the other; structure between and cooperating with said troughs for surrounding an air space open below and above; whereby said troughs have the double function of holding and conducting water and surrounding said space for facilitating upward convection of cooling air entering at the lower part of the space; the inner walls of opposite sections of the troughs having spaced openings therein; means for supplying warm water to be cooled to the upper trough; removable and replaceable widely spaced channel header sheets supported between said opposite sections of the upper trough, and vertically elongated spaced openings communicating with the upper trough; upwardly open upper distributing channels having lower flat faces and upright side walls having upper overflow edges all in the same horizontal plane less elevated than the top of the trough and having their opposite ends fitting in said openings of the upper trough; said channels being free of structure adjacent to and between said edges; film plates as wide as the upper channels having flat upper faces disposed under the flat face of the upper channels, and wide side faces in the same plane with the outer faces of said upright side walls to receive warm water overflowing from said overflow edges, to be cooled and to cause the cooling air to rise by convection; spaced horizontal collecting channels receiving said lower extensions and having their opposite ends communicating with said lower trough; and means for causing air to pass into the bottom of said space and assist the convection moving the air upwardly between the film plates.

References Cited in the file of this patent

UNITED STATES PATENTS

| | | |
|---|---|---|
| 265,974 | Nichols | Oct. 17, 1882 |
| 1,139,053 | Murray et al. | May 11, 1915 |
| 1,367,701 | Haynes | Feb. 8, 1921 |
| 1,822,755 | Smith et al. | Sept. 8, 1931 |
| 1,929,411 | Coey | Oct. 10, 1933 |
| 2,083,468 | Nahigyan | June 8, 1937 |
| 2,363,578 | Dieter | Nov. 28, 1944 |
| 2,609,888 | Beringer | Sept. 9, 1952 |
| 2,661,197 | Norman | Dec. 1, 1953 |

FOREIGN PATENTS

| | | |
|---|---|---|
| 4,570 | Great Britain | Feb. 24, 1909 |
| 110,594 | Germany | May 11, 1900 |
| 668,293 | Great Britain | Mar. 12, 1952 |